July 21, 1936.   H. C. BOSTWICK   2,048,536
ADJUSTABLE TIRE BUILDING DRUM
Filed Dec. 5, 1933
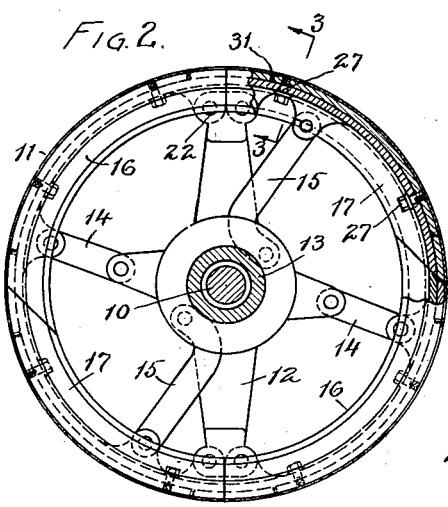
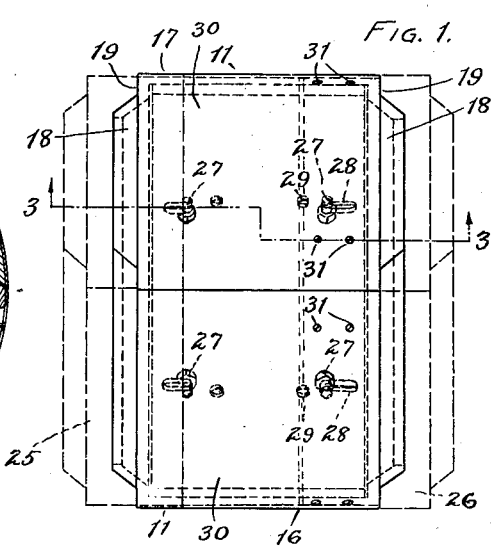
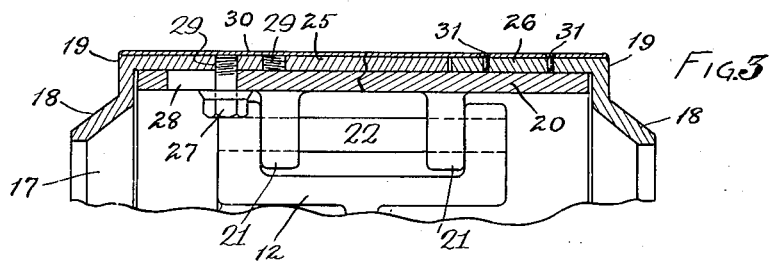
Inventor,
H. C. Bostwick,
By Robert M. Pierson,
Attorney Patented July 21, 1936

2,048,536

UNITED STATES PATENT OFFICE 2,048,536

ADJUSTABLE TIRE BUILDING DRUM

Henry C. Bostwick, Coventry Township, Summit County, Ohio, assignor to The Akron Standard Mold Company, Akron, Ohio, a corporation of Ohio Application December 5, 1933, Serial No. 700,987

1 Claim. (Cl. 154—9)

This invention relates to segmental, collapsible drums or chucks having a widthwise adjustment for building tire bands of different widths. Its objects are to reduce the number of sliding shouldered joints exposed on the periphery of each segment, to bring the joint to the marginal shoulder of the drum at the narrowest adjustment so that there may be no intermediate shoulder at that adjustment, and to strengthen the drum structure.

Of the accompanying drawing, Fig. 1 is a side elevation of a tire-building drum embodying my improvements.

Fig. 2 is an end elevation as viewed from the right in Fig. 1, partly broken away and in section.

Fig. 3 is a partial longitudinal section approximately on the lines 3—3 of Figs. 1 and 2.

In the drawing, 10 is a central driving shaft for supporting and rotating the drum or chuck 11, which has a segment-supporting spider 12 on said shaft, and a tubular control shaft 13 surrounding the driving shaft and having its end flange or collar connected by toggle links 14, 15 with the four drum segments 16, 17 which are pivoted in pairs at opposite ends of said spider 12 and collectively constitute the drum shell. The drum has an intermediate cylindrical portion and is formed at the side edges thereof with the usual depressed conical flanges 18 for supporting the margins of the under-bead plies of tire carcass fabric while being rolled down, and with radial bead-seating shoulders 19.

Each drum segment 16 or 17 includes a body or base segment 20 having inwardly-projecting hinge ears 21 turning on a pivot pin 22 carried by ears on one of the arms of the spider 12, said segment having an outer surface substantially flat transversely throughout its width, and an overlying pair of wing segments 25 and 26 formed with the marginal flanges 18 and bead seats 19, each being secured upon the body segment by a pair of circumferentially spaced cap screws 27 having their heads under the body segment. To provide a lateral adjustment for these wing segments to vary the width or axial length of the drum, the stem of each screw extends through a laterally elongated slot 28 into either of a pair of threaded holes 29 in the wing segment, the partially extended adjustment being indicated by broken lines in Fig. 1 and the contracted or narrowest adjustment by full lines. The left-hand wing segment 25 is wider than the segment 26 and at the narrowest adjustment the inner edges of the two substantially meet each other.

Upon the wing segment 26 is mounted a thin shell segment 30 which overlies and is adapted to be supported by more or less of the width of the wing segment 25 to provide an axially continuous drum surface at all adjustments. To facilitate proper fabrication of this shell member in a relatively thin section it is preferably made as a separate piece, as illustrated, and secured upon the wing segment 26 by transverse rows of attaching rivets or screws 31.

I also prefer, as herein shown, to extend the right-hand edge of the member 30 to the corresponding bead-seating shoulder 19, so that it forms a part of said shoulder, and similarly to extend its remote or left-hand edge to the other bead-seating shoulder to form a part of the latter when the drum has its narrowest or most-contracted adjustment as represented in full lines.

By thus attaching the shell member 30 to one of the adjustable wing segments instead of using a gap-shield fixed upon a central chuck rib, whose width is limited by the necessity of providing wide attaching portions upon the base segment to obtain the desired drum strength and range of adjustment, as has heretofore been customary, I reduce the liability to breaking off of the shield segments through the provision of a wider and more secure attachment for said member, and eliminate one of the sliding joints on the drum surface which have heretofore collected the cement often used upon these drums to adhere the leading edge of the first fabric ply and which may gape when the drum has been considerably used. Since the bridging segment members 30 are attached to wing segments 26 adjustably secured upon the permanently mounted base segments 20 of the chuck by fastening screws 27 accessible from the inner sides of said base segments, circumferential alignment of both edges of each segment 26, including the members 30, with the edges of adjacent segments is readily obtainable on the chuck, without removal of any parts of the latter. Furthermore, if the edge of the member 30 is extended permanently to one drum shoulder and its other edge to the opposite shoulder at the narrowest adjustment, as shown in this preferred embodiment, I avoid one of the steps or intermediate shoulders heretofore appearing on the cylindrical drum periphery, over which the fabric must be rolled down, and also eliminate the other intermediate step or shoulder at said narrowest adjustment, so that the narrowest tire bands for which the drum is intended can be haudled on a smooth-surfaced drum having no intermediate steps. The greater width of the wing segments 25 as compared with 26 permits an increased overlap and consequent wider support of members 30 on the segments 25 at extended adjustments of the wing segments. Such underlying support exists at the middle of the drum throughout the greater part of the range of adjustment, and substantially at the middle even at the widest adjustment.

I claim:

A radially collapsible tire-building drum composed of segments each of which includes a body or base segment having an outer surface substantially flat transversely throughout its width, a pair of wing members, one of which is narrower than the other, supported on said base segment and adapted substantially to meet at their adjacent edges, means for fixedly securing said wing members to the base segment at different lateral adjustments to vary the width of the drum, and an outer member fixed to the narrower one of said wing members and overlying the other wing member at all adjustments.

HENRY C. BOSTWICK.